(12) United States Patent
Chen

(10) Patent No.: US 6,992,799 B1
(45) Date of Patent: Jan. 31, 2006

(54) SCANNER WITH AN OUTPUT PORT CONNECTED TO A PRINTER OR A STORAGE DEVICE

(75) Inventor: Michael Chen, Hsinchu (TW)

(73) Assignee: Avision Inc., Hsin-Chu Hsien (TW)

( * ) Notice: Subject to any disclaimer, the term of this patent is extended or adjusted under 35 U.S.C. 154(b) by 627 days.

(21) Appl. No.: 09/639,825

(22) Filed: Aug. 17, 2000

(30) Foreign Application Priority Data

Mar. 10, 2000 (TW) .............................. 89104333 A

(51) Int. Cl.
*H04N 1/32* (2006.01)

(52) U.S. Cl. .................... 358/442; 358/409; 382/313

(58) Field of Classification Search ............... 358/442, 358/472, 473, 491, 448, 444, 400, 409; 347/19; 382/313
See application file for complete search history.

(56) References Cited

U.S. PATENT DOCUMENTS 5,550,938 A * 8/1996 Hayakawa et al. ......... 382/313
6,504,626 B1 * 1/2003 Shih .......................... 358/442

FOREIGN PATENT DOCUMENTS

CN 2368086 Y 3/2000
TW 320371 11/1997

* cited by examiner

*Primary Examiner*—Edward Coles
*Assistant Examiner*—Heather D. Gibbs
(74) *Attorney, Agent, or Firm*—Winston Hsu

(57) ABSTRACT

A scanner with an output port connected to a printer or a storage device. The scanner includes a casing, a scanning module installed inside the casing for scanning a document and generating corresponding image data, a control unit installed in the casing for controlling the operations of the scanner, and an output port electrically connected to the control unit for connecting to an external printer or a portable storage device. When the scanning module finishes scanning a document, the control unit transmits the image data of the document to the storage device or to the printer for printing according to the type of device connected to the output port.

19 Claims, 4 Drawing Sheets

SCANNER WITH AN OUTPUT PORT CONNECTED TO A PRINTER OR A STORAGE DEVICE

BACKGROUND OF THE INVENTION

1. Field of the Invention

The present invention relates to a scanner, and more particularly, to a scanner with an output port connected to a printer or a storage device.

2. Description of the Prior Art

Scanners are common computer peripherals that are used for scanning documents and generating corresponding image data. The prior art scanner must be connected to a host computer when performing its various functions. For example, a prior art scanner is typically connected to printer, via a computer, for printing out document image data, thereby achieving the functionality of a copier. Alternatively, the scanner may be connected to a portable storage device, via a computer, for storing image data in the storage device, enabling users in public places, such as libraries or offices, to take away the image data on a digital media. However, as a host computer controls the operations of the scanner in both examples, such functionality is not convenient for those users who are unfamiliar with the basic operations of a computer.

The prior art scanner includes a casing, a scanning module installed inside the casing for scanning a document and generating corresponding image data, and a connecting port installed in the casing for electrically connecting to a computer. When the scanning module finishes scanning the document, the image data of the document is transmitted to the computer via the connecting port. The data is subsequently processed by the computer, and the image data may be stored on the hard disk of the computer or it may be transmitted to the printer.

Portable storage devices typically connect to a computer via a printer port, a serial port, or standard interfaces, such as SCSI or USB. These interfaces are the interfaces that are often used to establish communications between a printer and a computer. If the said interfaces can be built into the scanner, and an appropriate control circuit with an independent processor are incorporated with the scanner to simulate typical computer controlling signals, the scanner could function independently of a computer. Users unfamiliar with the operations of a computer would be able to easily take advantage of the functionality of the scanner. The scanner could operate as a copier, or could be used to store document image data onto a portable storage media so that the user could take away the information in a digital format. Furthermore, the loss of image quality during the scanning and printing procedures can be reduced.

A prior art (R.O.C patent number: 370760) document discloses a scanner with a portable storage device built in to it. The scanner, however, is unsuitable for actual use. Portable storage devices are continually being replaced by new designs. Storage capacity is getting growing, and the associated storage format is changing rapidly. Devices designed by the same company, but manufactured in different periods, are not always compatible. Storage devices with different formats, manufactured by different companies, have even more incompatibility problems. For example, there are at least thirty or forty types of portable storage devices known and chosen by people in the market, such as a 3.5 inch floppy disks, a PCMCIA cards, portable hard disks, externally connected hard disks, LS120 devices, CD-R devices, CD-RW devices, DVD-RAM devices (in more than seven different formats), ZIP drives, etc. Regardless of the type of portable storage device that is built into the scanner, it will soon be superseded by newer devices. As only two or three types of portable storage devices can be incorporated into the prior art scanner, if the user doesn't have the appropriate format, he or she will be unable to store the image data. For example, if a PCMCIA card is built into the scanner, users having a PCMCIA card can store image data from the scanner and take it away. Another user, however, who has only a CD-R as storage device, will be unable to save the image data.

On the other hand, the interfaces of portable storage devices are rarely changed. For example, almost every portable storage device uses a parallel port, a serial port, a SCSI port or a USB port on the computer. If the scanner provides the type of interface that is usually used for portable storage devices, rather than providing a storage device built into the scanner, users may easily connect every kind of portable storage device to the scanner. SCSI interfaces, for example, are used on many portable storage devices. Such an interface could be built into the scanner, enabling users who intend to store image data to save the data on their SCSI storage device. Similar functionality could be made use of the other types of ports mentioned above. In this manner, the ever-changing media formats of storage devices, and the resulting incompatibilities, can be avoided.

SUMMARY OF THE INVENTION

It is therefore a primary objective of the present invention to provide a scanner which may be operated independently of a computer, the scanner having an output port connected to a printer or a storage device so as to solve the above mentioned problems.

In an preferred embodiment of the present invention, the scanner includes a casing, a scanning module installed inside the casing for scanning a document and generating corresponding image data, a control unit installed in the casing for controlling the operations of the scanner, and an output port electrically connected to the control unit for connecting to an external printer or to a portable storage device. When the scanning module finishes scanning a document, the control unit transmits the image data of the document to the storage device or to the printer according to the kind of the device connected to the output port.

The present invention scanner includes a control unit and an output port, and can be connected to a printer or to a portable storage device. The control unit controls the storage or printing of the image data of the document according to the type of device that is connected to the output port. Users may chose either one as needed.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

Figure 1:
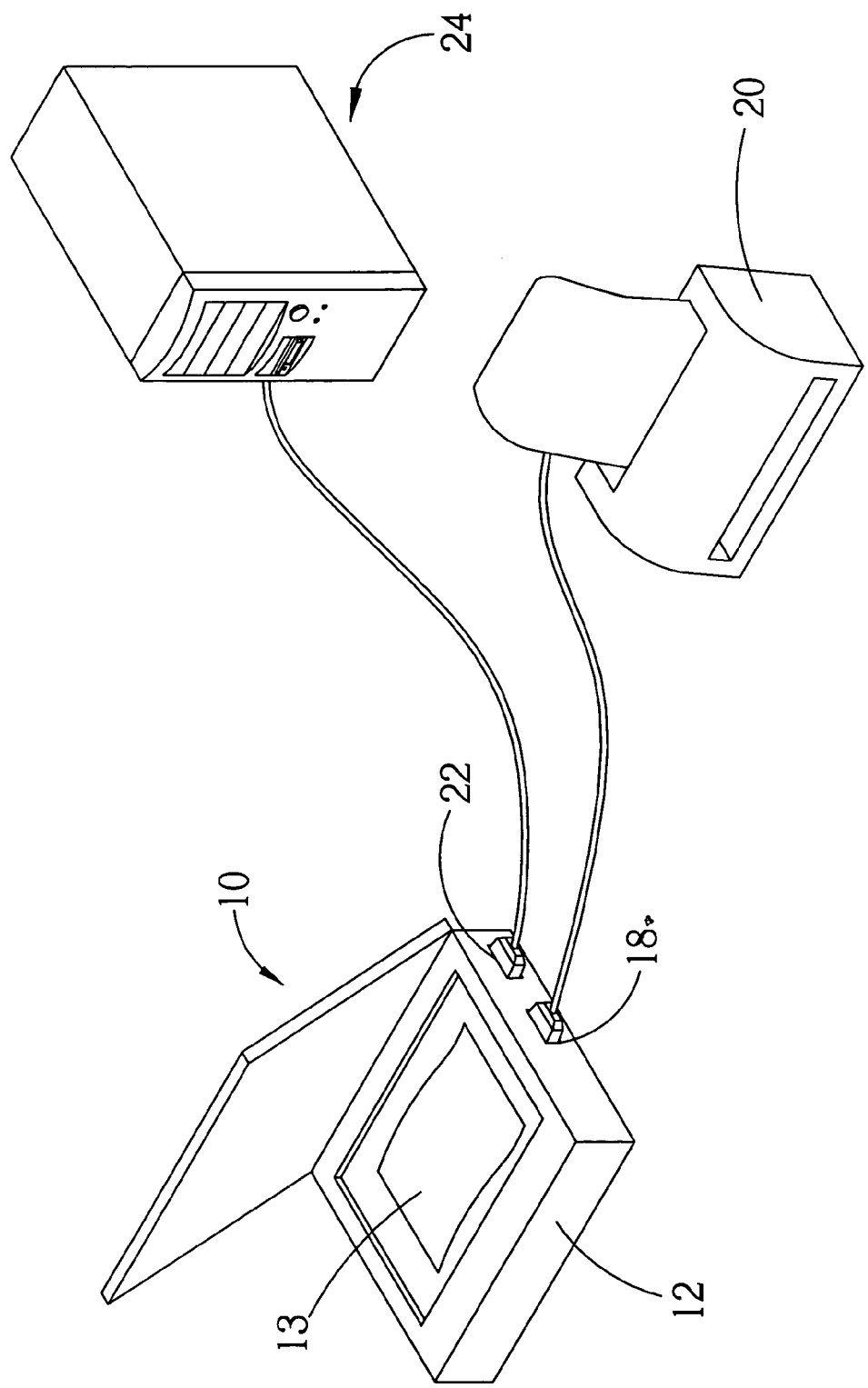
FIG. 1 is a schematic diagram of the present invention scanner.
Figure 2:
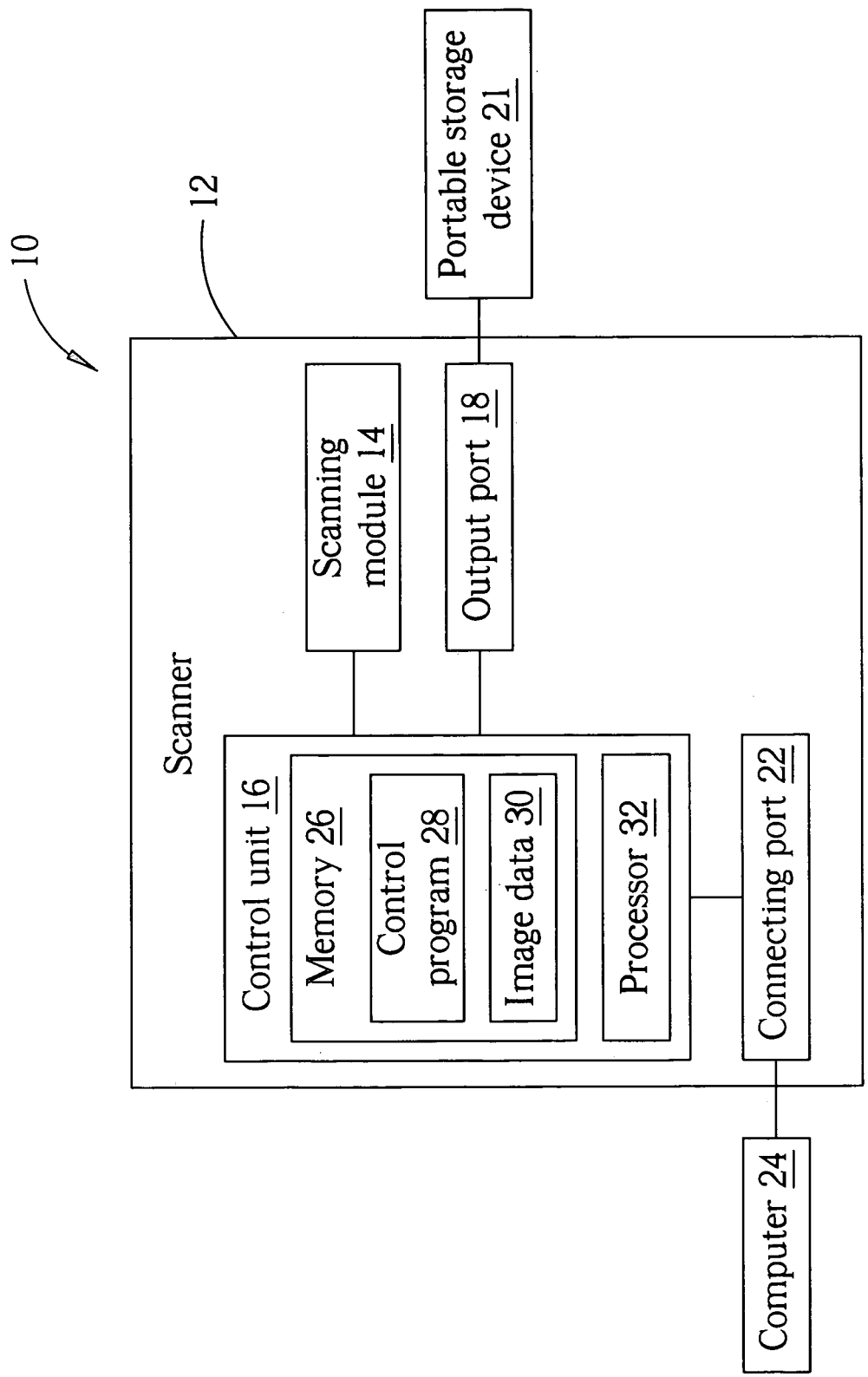
FIG. 2 is a functional block diagram of the scanner shown in FIG. 1.

Please refer to FIG. 1 and FIG. 2. FIG. 1 is a schematic diagram of the present invention scanner 10. FIG. 2 is a functional block diagram of the scanner 10 shown in FIG. 1. The scanner 10 includes a casing 12, a scanning module 14 installed inside the casing for scanning a document 13 and generating corresponding image data 30, a control unit 16 installed in the casing for controlling the operations of the scanner 10, an output port 18 electrically connected to the control unit 16 for connecting to an external printer 20 or to a portable storage device 21, and a connecting port 22 installed on the casing and electrically connected to the control unit 16 for optionally connecting the scanner 10 to a computer 24. The portable storage device 21 could be a hard drive, a floppy drive, a writable optical drive, etc. In the embodiment depicted, only the printer 20 shown in FIG. 1 is connected to the scanner 10, and only the portable storage device 21 in FIG. 2 is connected. When the scanning module 14 finishes scanning the document 13, the control unit 16 transmits the image data 30 of the document 13 to the storage device 21 or to the printer 20, depending on the type of device that is connected to the output port 16.

The control unit 16 includes a memory 26 for storing both a control program 28 and the image data 30 generated by the scanning module 14, and a processor 32 for executing the control program 28. When the scanning module 14 finishes scanning the document 13, the control program 28 identifies the device connected to the output port 18 and then controls the transmission of the image data 30 of the document 13 from the memory 26 to the storage device 21 or to the printer 20 via the output port 18. Hence, the image data 30 need not be processed by the computer 24. Because the present invention scanner 10 can be used without the computer 24, a user only needs the scanner 10 and the printer 20, or the portable storage device 21, to print or store image data generated by scanning. In public places, such as a library or an office, the present invention scanner can be connected to at least one storage device 21 according to the specific output port, and users only need to have the proper corresponding storage media to take away the image data.

When the scanning module 14 finishes scanning the document 13, the control unit 16 may also transmit the image data 30 of the document 13 to the computer 24 via the connecting port 22. The computer 24 may then transmit the image data to the printer 20. Hence, the present invention scanner 10 can store or print data both with and without the computer 24. Users may choose either option as needed.

Figure 3:
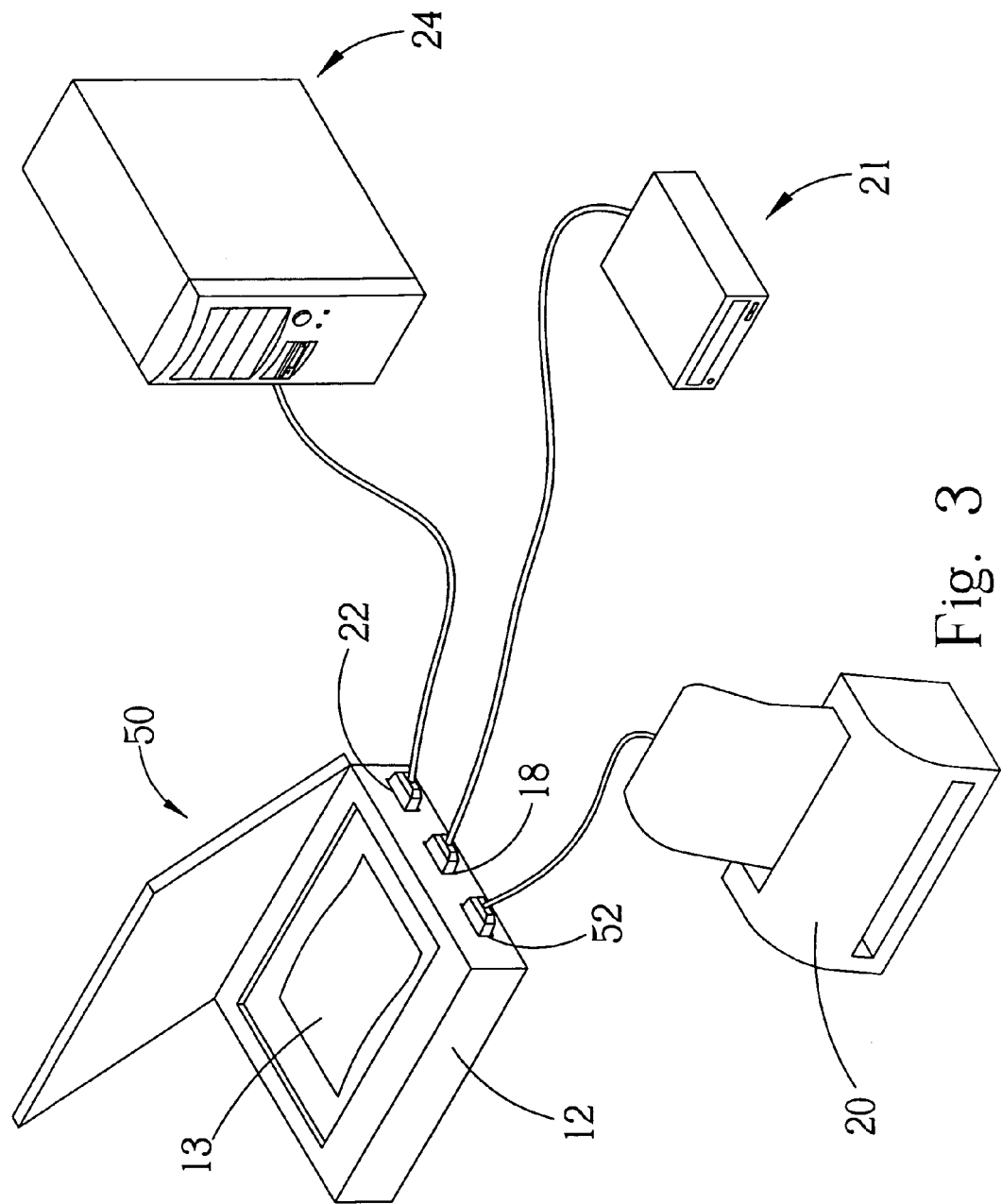
FIG. 3 is an alternative scanner of the present invention.
Figure 4:
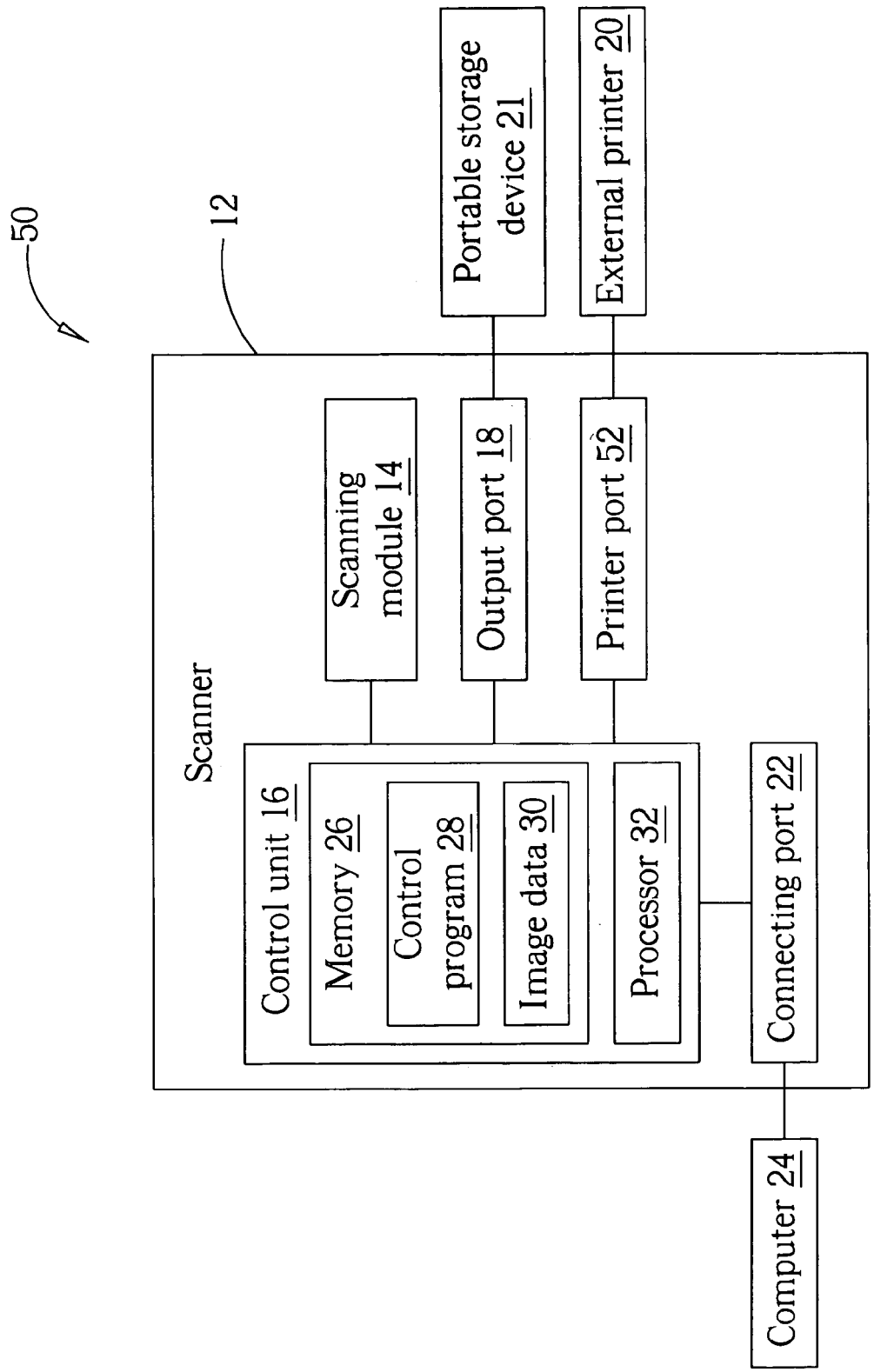
FIG. 4 is a functional block diagram of the scanner shown in FIG. 3.

Please refer to FIG. 3 and FIG. 4. FIG. 3 is an alternative scanner 50 of the present invention. FIG. 4 is a functional block diagram of the scanner 50 shown in FIG. 3. The main difference between the scanner 10 and the scanner 50 is that the output port 18 of the scanner 50 can only be connected to the portable storage device 21, and the scanner 50 further includes a printer port 52 electrically connected to the control unit 16 for connecting to an external printer 20. When the scanning module 50 finishes scanning the document 13, the control unit 16 transmits the image data 30 of the document 13 to the storage device 21 via the output port 18 or to the printer 20 via the printer port 52.

In contrast to the prior art scanner, the present invention scanners 10, 50 include control units and output ports, and can be externally connected to a printer or to a portable storage device. The control unit controls the storage or printing of the image data of the document according to the type of device that is connected to the output port. Hence, no host computer is required to perform printing or storing of scanning data.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A scanner comprising:
   a casing;
   a scanning module installed inside the casing for scanning a document and generating corresponding image data;
   a control unit installed in the casing, the control unit comprising at least a memory for storing a control program and the image data generated from the scanning module, and a processor for executing the control program to control the operations of the scanner; and
   an output port installed on the casing and electrically connected to the control unit for connecting to a portable storage device disposed outside the casing of the scanner, the portable storage device not being a computer, wherein the scanner acts as a master device and treats the portable storage device as a slave device;
   wherein when the scanning module finishes scanning a document, the control unit converts the image data of the document according to the type of the portable storage device that is connected to the output port and then directly transmits the image data converted by the control unit to the portable storage device, wherein the image data transmission is controlled only by the control unit.

2. The scanner of claim 1 wherein the scanner further comprises a printer port installed on the casing and electrically connected to the control unit for connecting to a printer, and when the scanning module finishes scanning a document, the control unit prints out the image data of the document via the printer.

3. The scanner of claim 2 wherein the control program first identifies the type of the portable storage device connected to the output port, and then controls the transmission of the image data of the document according to the said type.

4. The scanner of claim 1 wherein the scanner further comprises a connecting port installed on the casing and electrically connected to the control unit for connecting to a computer, and when the scanning module finishes scanning the document, the control unit transmits the image data of the document to the computer for further processing via the connecting port.

5. The scanner of claim 1 wherein the portable storage device is a standalone disk drive.

6. The scanner of claim 5 wherein the portable storage device is a hard disk drive.

7. The scanner of claim 5 wherein the portable storage device is a floppy disk drive.

8. The scanner of claim 5 wherein the portable storage device is a writable optical disk drive.

9. A scanner comprising:
   a casing;
   a scanning module installed inside the casing for scanning a document and generating corresponding image data;
   a control unit installed in the casing, the control unit comprising at least a memory for storing a control program and the image data generated from the scanning module, and a processor for executing the control program to control the operations of the scanner;

an output port installed on the casing and electrically connected to the control unit for connecting to an external portable storage device, the external portable storage device not being a computer, wherein the scanner acts as a master device and treats the external portable storage device as a slave device; and a printer port electrically connected to the control unit for connecting to an external printer;

wherein when the scanning module finishes scanning a document, the control unit converts the image data of the document and then directly transmits the image data converted by the control unit to the external portable storage device via the output port, wherein the image data transmission is controlled only by the control unit, or converts the image data of the document and then transmits the image data converted by the control unit to the printer via the printer port for printing.

10. The scanner of claim 9 wherein the scanner further comprises a connecting port installed on the casing and electrically connected to the control unit for connecting to a computer, and when the scanning module finishes scanning the document, the control unit transmits the image data of the document to the computer for further processing via the connecting port.

11. The scanner of claim 9 wherein the external portable storage device is a standalone disk drive.

12. The scanner of claim 11 wherein the external portable storage device is a hard disk drive.

13. The scanner of claim 11 wherein the external portable storage device is a floppy disk drive.

14. The scanner of claim 11 wherein the external portable storage device is a writable optical disk drive.

15. A scanning system comprising:
a portable storage device which is not a computer; and
a scanner, the scanner comprising:
a casing;
a scanning module installed inside the casing for scanning a document and generating corresponding image data;
a control unit installed in the casing, the control unit comprising at least a memory for storing a control program and the image data generated from the scanning module, and a processor for executing the control program to control the operations of the scanner; and
an output port installed on the casing and electrically connected to the control unit for connecting to the portable storage device disposed outside the casing of the scanner, wherein the scanner acts as a master device and treats the portable storage device as a slave device;
wherein when the scanning module finishes scanning a document, the control unit converts the image data of the document according to the type of the portable storage device that is connected to the output port and then directly transmits the image data converted by the control unit to the portable storage device, wherein the image data transmission is controlled only by the control unit.

16. The scanning system of claim 15 wherein the portable storage device is a standalone disk drive.

17. The scanning system of claim 16 wherein the portable storage device is a hard disk drive.

18. The scanning system of claim 16 wherein the portable storage device is a floppy disk drive.

19. The scanning system of claim 16 wherein the portable storage device is a writable optical disk drive.

\* \* \* \* \*